United States Patent [19]

Jirka

[11] Patent Number: 4,780,696
[45] Date of Patent: Oct. 25, 1988

[54] MULTIFILAR TRANSFORMER APPARATUS AND WINDING METHOD

[75] Inventor: Howard F. Jirka, Crystal Lake, Ill.

[73] Assignee: American Telephone and Telegraph Company, AT&T Bell Laboratories, Murray Hill, N.J.

[21] Appl. No.: 911,817

[22] Filed: Sep. 26, 1986

Related U.S. Application Data

[62] Division of Ser. No. 763,668, Aug. 8, 1985, Pat. No. 4,679,132.

[51] Int. Cl.$^4$ .................. H01F 27/28; H01F 11/04; H01B 13/00
[52] U.S. Cl. .................... 336/170; 336/180; 336/182; 242/7.03; 242/7.11
[58] Field of Search ............ 242/7.03, 7.01, 7.02, 242/7.06, 7.07, 7.09, 7.11; 336/170, 171, 180, 182, 183

[56] References Cited

U.S. PATENT DOCUMENTS

| | | | |
|---|---|---|---|
| 3,576,505 | 4/1971 | Seidel | 336/170 X |
| 3,985,310 | 10/1976 | Kent et al. | 242/4 R |
| 4,007,413 | 2/1977 | Fisher et al. | 321/2 |
| 4,042,844 | 8/1977 | Barthold | 307/314 |
| 4,045,718 | 8/1977 | Gray | 320/17 |
| 4,092,709 | 5/1978 | Voight et al. | 363/18 |
| 4,256,268 | 3/1981 | Fahrbach | 242/7.11 |
| 4,274,133 | 6/1981 | Cuk et al. | 363/39 |
| 4,408,267 | 10/1983 | Pruitt | 363/17 |
| 4,481,565 | 11/1984 | Colton | 363/56 |
| 4,499,532 | 2/1985 | Hudson et al. | 363/21 |
| 4,504,896 | 3/1986 | Easter et al. | 363/21 |

FOREIGN PATENT DOCUMENTS

83/107388.7 7/1983 European Pat. Off. .

Primary Examiner—Stanley N. Gilreath
Attorney, Agent, or Firm—Ross T. Watland

[57] ABSTRACT

A multifilar transformer apparatus and winding method where first and second windings are bifilar wound around a core for NA turns, the first, second, third, and fourth windings are quadfilar wound around the core for NB turns, and the first and second windings are again bifilar wound around the core for NC turns. Winding symmetry is preserved and a turns ration of (NA+NB+NC):2NB is achieved.

4 Claims, 9 Drawing Sheets

WINDING STRUCTURE
OF TRANSFORMER 410

401: SEPARATE WINDING
406: BIFILAR SECTION
405: QUADFILAR SECTION
404: BIFILAR SECTION

WINDING STRUCTURE
OF TRANSFORMER 210
(PRIOR ART)
FIG. 4

MULTIFILAR WINDING METHOD
FOR TRANSFORMER 410

FIG. 10

WINDING STRUCTURE
OF TRANSFORMER 410

FIG. 11

MULTIFILAR TRANSFORMER APPARATUS AND WINDING METHOD

CROSS REFERENCE TO RELATED APPLICATION

This is a division of application Ser. No. 763,668, filed Aug. 8, 1985, now U.S. Pat. No. 4,679,132.

TECHNICAL FIELD

This invention relates to power converters, and more particularly, to the use of a multifilar transformer in such converters to balance interwinding capacitive effects and thereby achieve a substantial reduction in the electrical noise generated at the converter output.

BACKGROUND OF THE INVENTION

In telephone systems, line circuits serve as an interface between communication lines connected to subscriber sets and the telephone switching network. Traditionally, the line circuit has included a battery feed to energize the subscriber set. It has been recognized that the effect of longitudinal currents, which are frequently induced in a subscriber loop because of nearby electrical power lines, can be minimized when the batter feed is capable of floating with respect to ground. Known line circuits have implemented a floating battery feed by using a transformer to isolate the subscriber set from the office DC source.

In the floating battery feed circuit disclosed in U.S. Pat. No. 4,499,532 issued to R. C. Hudson et al., on Feb. 12, 1985, a switching-mode, flyback power converter uses a multi-winding transformer to supply power from a source of potential to an electrical load. A switching transistor is used to selectively connect the source to the transformer primary winding. When the transistor is turned on, energy from the source is stored by the transformer since a diode connected between the transformer secondary winding and the load is reverse biased to prevent secondary current flow. However, when the transistor is subsequently turned off, the voltages across the primary and secondary windings reverse polarity and the energy previously stored by the transformer is transferred to the load. As is typical of such power converters, the switching transistor is cycled at a relatively high rate, e.g., 64 kilohertz. A recognized problem in the art is that power converters of this type frequently generate unacceptable levels of high frequency, common-mode, electrical noise at their output terminals because of the high switching rate.

SUMMARY OF THE INVENTION

The aforementioned problem is solved and a technical advance is achieved in accordance with the principles of the invention in a battery feed circuit where a multifilar transformer, i.e., a transformer where the multiple conductors are wound side by side as a parallel group, is incorporated in a switching-mode, flyback converter in such manner that advantageously the interwinding capacitances, which are all substantially equal because of the multifilar winding technique, cause a cancellation of common-mode, noise components at the converter output.

The multifilar transformer winding of the multiple conductors side by side as a parallel group is in contrast with conventional winding methods where the individual windings are wound separately. Bifilar winding, for example, refers to the side by side winding of two conductors as a parallel group and quadfilar winding refers to the side by side winding of four conductors. The term multifilar is used herein to refer both to the case where the windings have the same number of turns and the conductors of the windings are wound together for all of the winding turns and also to the case where the windings have different numbers of turns and one number of windings are wound together for some of the turns and a lesser number of the windings are wound together for other turns. For example, the windings of a transformer having four windings quadfilar wound together for all of their turns are referred to as being multifilar wound. However, the four windings of a transformer are also referred to as being multifilar wound where only two of the windings are bifilar wound for a number of turns and all four windings are quadfilar wound for other turns.

The characteristic of the multifilar winding method that is of primary importance to the invention is the substantially equal inter-winding capacitances which result. The equal inter-winding capacitances are used to advantage to couple electrical noise voltages to the converter output from two windings that are circuit-wise connected such that equal but opposite voltages are produced therein. The noise components coupled to the converter output from the two windings are substantially equal because of the equal coupling capacitances and tend, therefore, to cancel one another to substantially reduce the resultant electrical noise. The noise reduction is further enhanced by interposing the unidirectional current means necessary for the proper operation of the flyback converter, symmetrically between two serially-connected windings used to deliver power to the load.

The battery feed circuit supplies power from a source of potential having first and second terminals, to an electrical load having first and second terminals. The circuit includes a transformer having first, second, third and fourth magnetically coupled windings. The windings are multifilar wound around a single core and each winding has a first polarity end and a second polarity end. In the exemplary circuit of FIG. 1, the first and second windings are the windings having equal but opposite voltages produced therein and are designated as windings 403 and 402, respectively. The third and fourth windings are the windings used to deliver power to the load and are designated as windings 408 and 407, respectively.

To elaborate, the second polarity end of the first winding and the first polarity end of the second winding are both connectible to the first terminal of the source. The first polarity end of the third winding is connectible to the second polarity end of the fourth winding. The second polarity end of the third winding is connectible to the first terminal of the load and the first polarity end of the fourth winding is connectible to the second terminal of the load. A switch, e.g., a transistor, operates to cyclically connect the first polarity end of the first winding to the second terminal of the source. A unidirectional current means, e.g., a diode, is serially connected with the third and fourth windings and allows only unidirectional current flow through the third and fourth windings to supply power to the load. Because of the defined multifilar winding arrangement and interconnection, the illustrative embodiment advantageously reduces an electrical noise component coupled from the first winding to the load, by an opposite polarity electrical noise component coupled from the second winding to the load.

In the exemplary circuit, the first and second windings have substantially equal numbers of turns N1 and N2, and the third and fourth windings also have substantially equal numbers of turns N3 and N4. The diode is advantageously interposed between the first polarity end of the third winding and the second polarity end of the fourth winding to preserve symmetry to equalize the opposite polarity noise components coupled to the load.

To achieve any desired turns ratio and still preserve the winding symmetry, the multifilar transformer is wound in accordance with the following method. First, the first and second windings are bifilar wound around the core for NA turns. Then, the first, second, third, and fourth windings are quadfilar wound around the core for NB turns. Finally, the first and second windings are again bifilar wound around the core for NC turns. Illustratively, NB is a positive integer substantially equal to N3 and NA and NC are positive integers each substantially equal to the absolute value of (N3−N1)/2. The turns ratio thus achieved is N1:(N3+N4).

The second winding also advantageously limits the voltage across the transistor switch. This is accomplished using a second diode, connected between the second polarity end of the second winding and the second terminal of the source, to limit the voltage across the second winding. The transistor switch voltage is thereby limited to the sum of the maximum voltages across the first and second windings.

BRIEF DESCRIPTION OF THE DRAWING

A more complete understanding of the invention may be obtained from a consideration of the following description when read in conjunction with the drawing in which.

DETAILED DESCRIPTION

Figure 1:
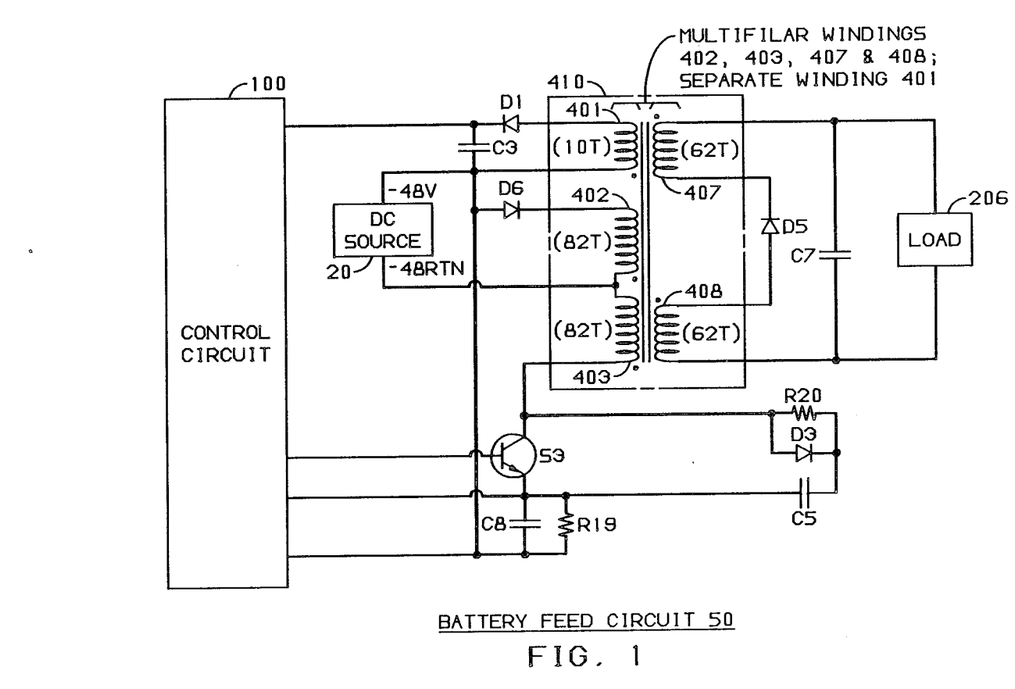
FIG. 1 is a diagram of an exemplary battery feed circuit incorporating a multifilar transformer in accordance with the present invention.

FIG. 1 is a diagram of an exemplary battery feed circuit 50 incorporating a multifilar transformer 410 in accordance with the present invention. Transformer 410 includes five windings 401, 402, 403, 407 and 408. Of the five windings, the four windings 402, 403, 407 and 408 are multifilar wound and winding 401 is separately wound. The method of winding transformer 410 is described later herein. Before describing the circuit of FIG. 1, the battery feed circuit 10 (FIG. 2) disclosed in the above-referenced Hudson et al., U.S. Pat. No. 4,499,532 is first described.

BATTERY FEED CIRCUIT 10 (PRIOR ART)

Figure 2:
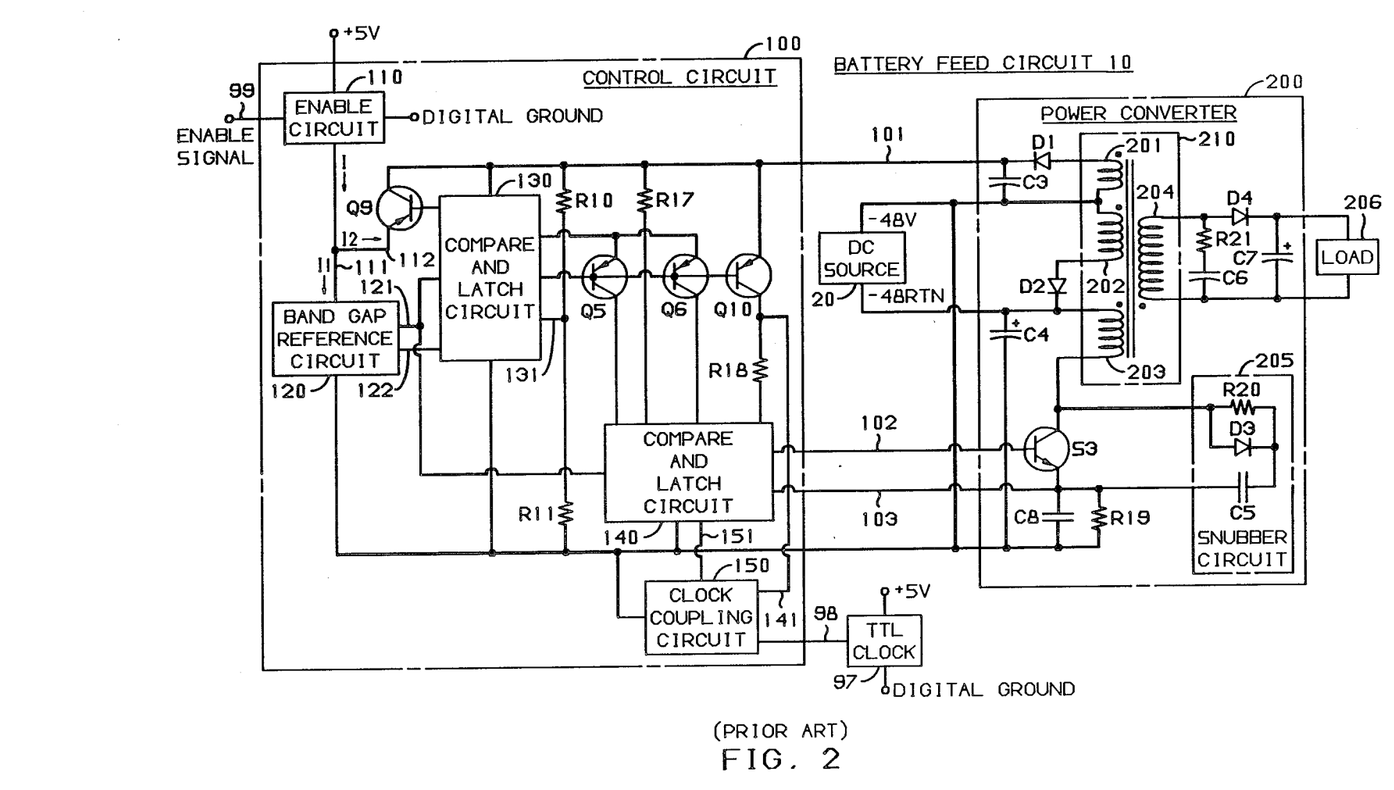
FIG. 2 is a diagram of the battery feed circuit described in the above-referenced Hudson et al., U.S. Pat. No. 4,499,532.

Battery feed circuit 10 includes a switchingmode flyback power converter 200 which operates to transfer energy to a load 206 from a 48-volt DC voltage source 20 having terminals designated −48 V and −48 RTN in FIG. 2. Power converter 200 includes a transformer 210 having a primary winding 203, a secondary winding 204, a catch winding 202, and a feedback winding 201. Primary winding 203 is connected in series with a switching transistor S3 and a resistor R19 across the 48-volt DC voltage source 20. Secondary winding 204 is connected via a diode D4 to a capacitor C7 connected in parallel with load 206. Switching transistor S3 is cyclicaly turned ON and OFF to alternately connect and disconnect DC voltage source 20 terminal −48 V and primary winding 203. When switching transistor S3 is turned ON, energy from DC voltage source 20 is stored by transformer 210 since diode 4 is reverse-biased and therefore no current can flow in secondary winding 204. However, when switching transistor S3 is subsequently turned OFF, the voltages across windings 203 and 204 reverse polarity, diode D4 becomes forward-biased and the energy previously stored by transformer 210 is transferred to capacitor C7 and load 206.

Figure 3:
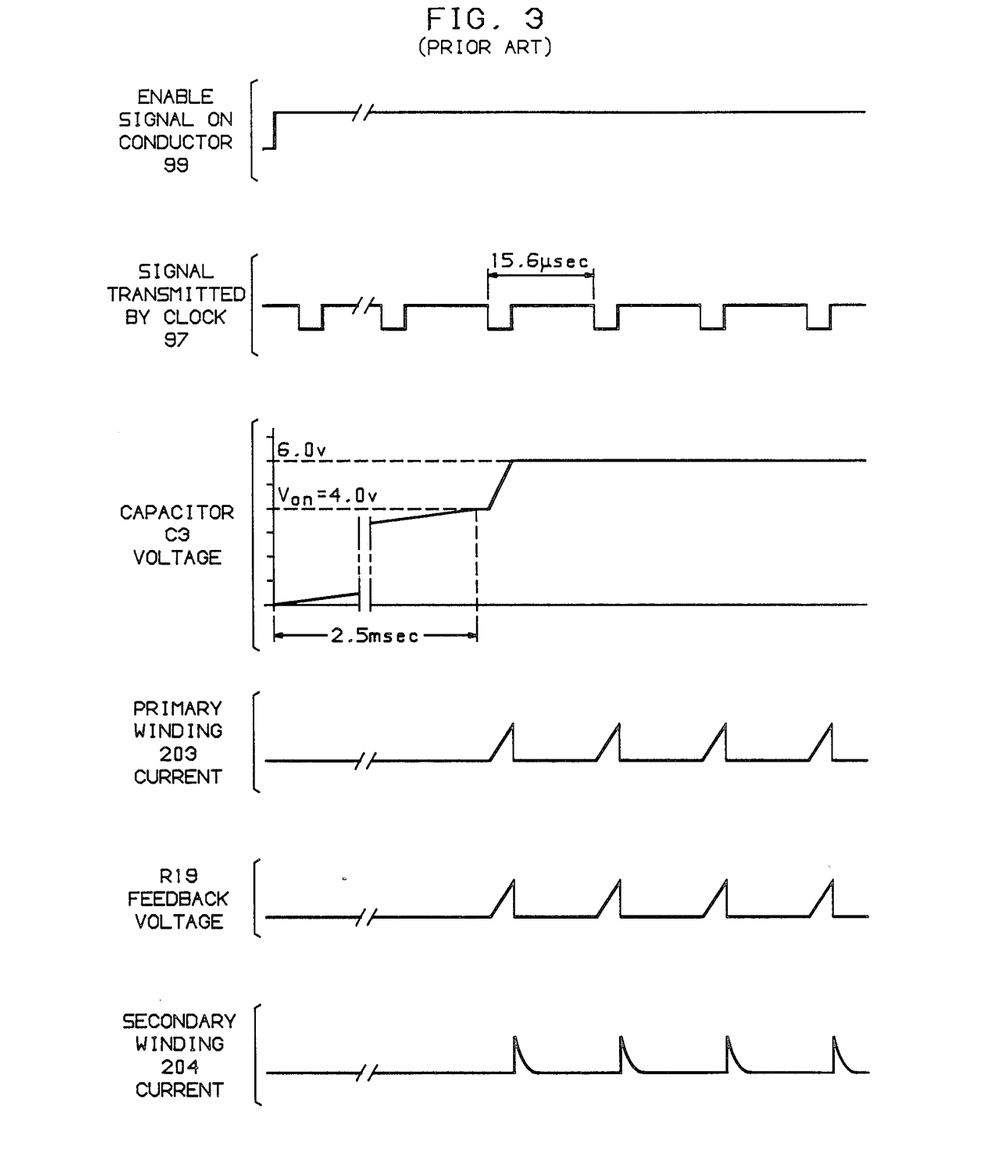
FIG. 3 is a timing diagram illustrating the relationship among various signal waveforms in the battery feed circuit of FIG. 2.

The operation of power converter 200 is controlled by a control circuit 100. Control circuit 100 is energized by the voltage developed by a capacitor C3 which is connected via a diode D1 to feedback winding 201. During each of the above-described power converter 200 operation cycles, energy from DC voltage source 20 is transferred via feedback winding 201 to capacitor C3 to maintain the capacitor C3 voltage. Capacitor C3 is initially substantially discharged. When a logic one enable signal (FIG. 3) is received on a conductor 99 to initiate the operation of battery feed circuit 10, an enable circuit 110 supplies current via a conductor 101 to charge capacitor C3. When sufficient energy has been stored in capacitor C3 such that the capacitor C3 voltage (FIG. 3) reaches a predetermined voltage, $V_{on}$, which in the described embodiment is approximately 4.0 volts, enable circuit 110 stops supplying current via conductor 101 to capacitor C3. A capacitor C3 voltage of 4.0 volts sufficiently energizes control circuit 100 to ensure the safe operaton of switching transistor S3 as further described herein. In the described embodiment, the capacitor C3 voltage reaches the predetermined voltage, $V_{on}$, approximately 2.5 milliseconds after the logic one enable signal is received on conductor 99.

A clock 97, energized by a 5-volt DC voltage source having terminals designated +5 V and DIGITAL GROUND in FIG. 2, generates a 64-kilohertz, 25 percent duty cycle clock signal (FIG. 3) on a conductor 98. Accordingly, the clock signal on conductor 98 has a period of approximately 15.6 microseconds. After the capacitor C3 voltage has reached the predetermined voltage, $V_{on}$, and a clock coupling circuit 150 subsequently receives, via conductor 98, a logic zero clock signal (FIG. 3) from clock 97, the current from an enabling transistor Q10 is provided via conductor 102 as base drive current (FIG. 3) to switching transistor S3. In response to the base drive current from enabling transistor Q10, switching transistor S3 turns ON to apply approximately 48 volts across primary winding 203. The current in primary winding 203 increases substantially linearly (FIG. 3) at a rate which depends on the inductance of winding 203. No current flows in secondary winding 204 because diode D4 is reverse-biased. Most of the energy supplied by the 48-volt DC voltage source 20 is stored by transformer 210. However, the voltage across primary winding 203 induces a voltage across feedback winding 201 to forward bias diode D1 and current is supplied to capacitor C3. In the described embodiment, the current from winding 201 increases the capacitor C3 voltage to approximately 6.0 volts.

A compare and latch circuit 140 monitors, via a conductor 103, the voltage across resistor R19 (FIG. 3), which voltage is proportional to the primary winding 203 current. When the voltage across resistor R19 increases to a predetermined voltage, $V_{ref}$, which in the described embodiment is approximately 1.236 volts, compare and latch circuit 140 reduces the base drive current (FIG. 3) supplied via conductor 102 to zero and switching transistor S3 turns OFF. The voltages across windings 203 and 204 reverse polarity, diode D4 becomes forward-biased, and a decreasing current (FIG. 3) flows from secondary winding 204 via diode D4 as the energy previously stored by transformer 210 is transferred to capacitor C7 and load 206. Capacitor C7 stores the energy received from secondary winding 204 to maintain a relatively constant voltage as energy is supplied to load 206. Note that in the described embodiment, switching transistor S3 turns OFF at approximately the same time that the clock signal transmitted by clock 97 changes from a logic zero to a logic one level. However, it is the increase in the resistor R19 voltage to $V_{ref}$, not the clock signal transition, that results in switching transistor S3 turnign OFF.

A second cycle is initiated when the next logic zero clock signal (FIG. 3) from clock 97 is received by clock coupling circuit 150 and the current from enabling transistor Q10 is again provided via conductor 102 as base drive current (FIG. 3) to turn switching transistor S3 ON. Energy from the 48-volt DC voltage source 20 is again stored by transformer 210 until the primary winding 203 current increases such that the voltage across resistor R19 reaches the predetermined voltage, $V_{ref}$. Switching transistor S3 is then turned OFF and the energy stored by transformer 210 is again transferred to capacitor C7 and load 206 to complete the second cycle. The process repeats and energy is transferred from the 48-volt DC voltage source 20 to load 206 via transformer 210 and capacitor C7 at a constant rate. Accordingly, battery feed circuit 10 supplies a constant magnitude of power independent of the value of load 206. During each cycle, the voltage across primary winding 203 induces a voltage across feedback winding 201 and a current flows to capacitor C3 to maintain its voltage at approximately 6.0 volts.

When the logic one enable signal is removed from conductor 99 to terminate the operation of battery feed circuit 10, enabling transistor Q10 stops supplying current via conductor 102 as base drive current to switching transistor S3. Accordingly, switching transistor S3 is not turned ON when subsequent logic zero clock signals are transmitted by clock 97 and, therefore, no additional energy is transferred from the 48-volt DC voltage source 20 to load 206. Advantageously, compare and latch circuit 140 diverts the current supplied by enabling transistor Q10 if clock 97 stops transmitting logic zero clock signals on conductor 98. Accordingly, switching transistor S3 is held safely in the OFF state. In addition, if the voltage across capacitor C3 falls below a predetermined voltage, $V_{off}$, which in the described embodiment is approximately 3.5 volts, enabling transistor Q10 stops supplying current via conductor 102 as base drive current to switching transistor S3 and enable circuit 110 again supplies current via conductor 101 to charge capacitor C3. When the capacitor C3 voltage again exceeds $V_{on}$, enable circuit 110 stops supplying current via conductor 101 to charge capacitor C3 and enabling transistor Q10 again supplies current via conductor 102 as base drive current to switching transistor S3 to resume operation.

The capacitor C3 connected across feedback winding 201 develops the voltage needed to energize control circuit 100 to supply base drive current to switching transistor S3. It is desirable that the supplied base drive current be sufficient to place switching transistor S3 in saturation. Otherwise, a large collector-emitter voltage may develop across transistor S3 and the power dissipated by transistor S3, as the primary winding 203 current (FIG. 3) increases, may be large enough to destroy the device. Accordingly, control circuit 100 advantageously does not begin to supply base drive current via conductor 102 to switching transistor S3 until the capacitor C3 voltage has increased to the predetermined voltage, $V_{on}$. Control circuit 100 is then able to supply a base drive current via conductor 102 of sufficient magnitude to saturate switching transistor S3. If, for any reason, the voltage falls below the predetermined voltage, $V_{off}$, control circuit 100 advantageously stops supplying base drive current via conductor 102 to switching transistor S3. Note that $V_{off}$ is less than $V_{on}$. This hysteresis prevents control circuit 100 from remaining in an intermediate equilibrium state, after the capacitor C3 voltage has been increased from zero to $V_{on}$, as could occur if the predetermined voltages $V_{off}$ and $V_{on}$ were equal.

The operation of control circuit 100, including the function of reference circuit 120, compare and latch circuit 130, transistors Q9, Q5 and Q6, and resistors R10, R11, R17 and R18, is described in greater detail in the above-referenced Hudson et al. patent.

Battery feed circuit 10 includes a number of features which improve its operation and reliability. For example, a snubber circuit 205, comprising a capacitor C5 in series with the parallel combination of a resistor R20 and a diode D3, is connected across switching transistor S3 to slow the increase in the transistor S3 collector-emitter voltage which results as transistor S3 turns OFF. the transistor S3 collector current is thereby given additional time to decrease and the power dissipated by transistor S3 does not exceed device safe operation limits. In addition, the current which flows from primary winding 203 through snubber circuit 205 and resistor R19, as switching transistor S3 turns OFF, results in a resistor R19 voltage which icnreases the rate at which base charge is removed to turn transistor S3 OFF.

A filter capacitor C4 is connected across the 48-volt DC voltage source 20 terminals −48 V and −48 RTN to filter voltage transients. A filter capacitor C8 is connected across resistor R19 to filter any voltage transients on conductor 103 from snubber circuit 205 and, in addition, to prevent the voltage across feedback resistor R19 from becoming negative. A negative voltage across resistor R19 could prevent switching transistor S3 from turning OFF.

A diode D2 connected in series with catch winding 202 across the 48-volt DC voltage source 20 terminals −148 V and −48 RTN limits the voltage developed across winding 202 during the transformer 210 discharge cycle to 48 volts. Catch winding 202 and primary winding 203 have the same number of turns. Therefore, the voltage across primary winding 203 is also, at most, 48 volts during the transformer 210 discharge cycle, with the end of winding 203 connected to switching transistor S3 being positive with respect to the DC voltage source 20 terminal −48 RTN. Thus, the collector-emitter voltage of transistor S3 is limited to 96 volts, which is within the allowable voltage range of the device. In addition, when a no-load condition is present across secondary winding 204, the energy stored in transformer 210 during the charge cycle will be returned during the discharge cycle, via catch winding 202 and diode D2 to the DC voltage source 20.

INCORPORATING A MULTIFILAR TRANSFORMER INTO BATTERY FEED CIRCUIT 50

In one embodiment of the circuit of FIG. 2, the four windings of transformer 210 are separately and sequentially wound. The four windings are: primary winding 203 having 81 turns, feedback winding 201 having 10 turns, secondary winding 204 having 123 turns, and catch winding 202 having 81 turns. In that embodiment, a substantial magnitude of electrical common-mode noise is generated at the converter 200 output at multiples of the 64-kilohertz clock frequency. To solve this problem, a multifilar transformer has been incorporated into the circuit in accordance with the present invention such that balanced interwinding capacitances act to effectively cancel the common-mode noise.

Figure 5:
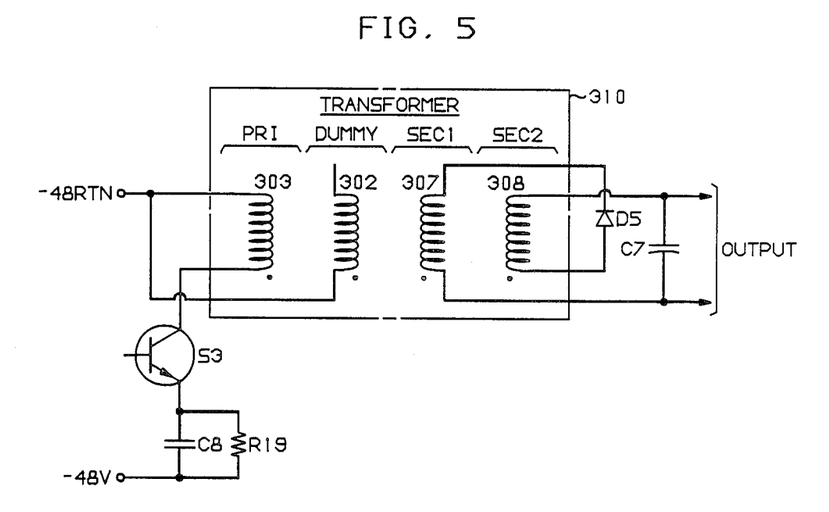
FIG. 5 is a skeletal schematic useful in understanding the principles of the present invention involving the advantageous reduction of common-mode noise achieved by employing a multifilar transformer.

To aid in understanding this canceling action, consider the skeletal schematic shown in FIG. 5. Transformer 310 has four windings 303, 302, 307 and 308 wound as a multifilar, parallel group around a single core. The well-known dot convention is used as a polarity marking to determine the sign of the mutual inductance term without reference to a detailed sketch of the windings. In FIG. 5, the winding around the core begins with the dotted end and is completed at the nondotted end. Primary winding 303 is connected between the collector of switching transistor S3 and the −48 RTN terminal of the DC voltage source 20. A dummy winding 302 has its dotted end also connected to the −48 RTN terminal but has its nondotted end unconnected. Two secondary windings 307 and 308 are connected in series by means of a diode D5 advantageously interposed therebetween, and the two series-connected windings are connected across the filter capacitor C7 at the converter output. The placement of diode D5 between windings 307 and 308 rather than at the other end of either winding is part of the symmetry which is responsible for the neutralizing action.

Figure 7:
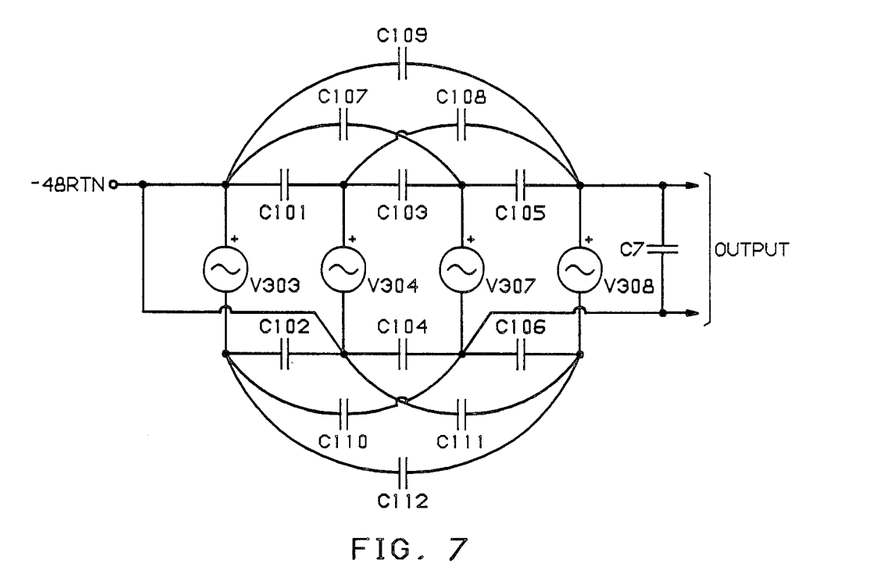
FIGS. 7 and 8 are equivalent circuit diagrams used to analyze the circuit of FIG. 5.
Figure 8:
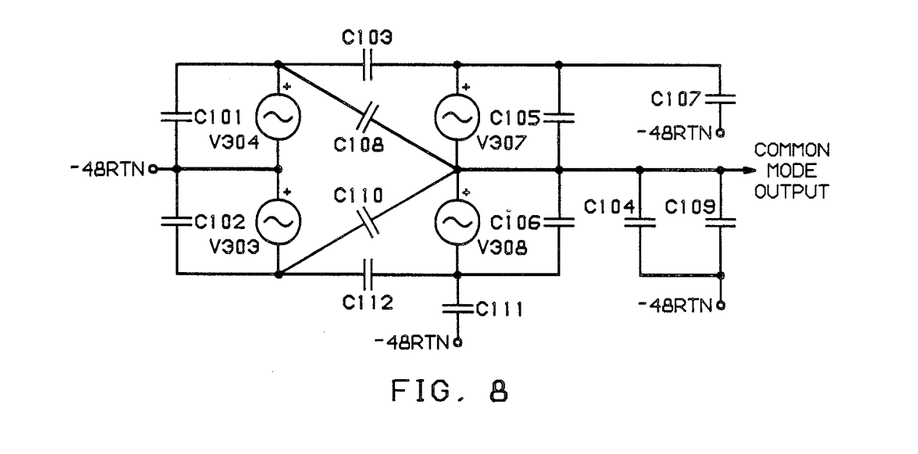

For this discussion, it is helpful to think of the primary winding 303 and the dummy winding 302 as the source of the signal which is capacitively coupled to the secondary windings 307 and 308. In FIG. 7, the circuit of FIG. 5 is redrawn with the windings 303, 304, 307 and 308 being replaced by voltage sources V303, V304, V307, and V308 respectively, which represent magnetically induced winding voltages. The capacitors C101 through C112 shown represent the various parasitic inter-winding capacitances, lumped at the terminals of the windings. Because of the multifilar winding technique the capacitors C101 through C112 are all substantially equal. An analysis of FIG. 7 indicates that the capacitors C101 through C112 are either in harmless locations, e.g., across a winding, or they occur in pairs which couple opposite polarity signals to the same or corresponding points on the secondary windings 307 and 308; in other words, they are self-neutralizing. In the analysis, the filter capacitor C7 is treated as a short circuit at the converter frequency. The circuit of FIG. 7 is redrawn in FIG. 8 to clarify these neutralizing relationships.

Figure 6:
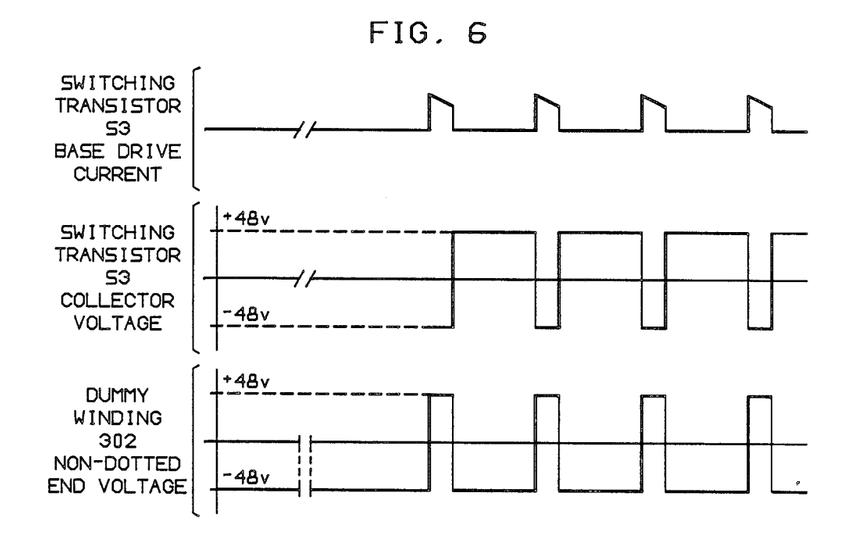
FIG. 6 is a timing diagram relevant to the circuit of FIG. 5.

The voltage at the collector of switching transistor S3 is shown in FIG. 6. The collector voltage is −48 volts when switching transistor S3 is turned ON and +48 volts when transistor S3 is turned OFF. Because of the inter-winding capacitances, a scaled replica of this voltage is coupled to the converter output. However, because of the advantageous opposite connection of dummy winding 304, a substantially equal but opposite voltage waveform (FIG. 6) is present at the nondotted end of winding 302. The scaled replica of this opposite voltage waveform is also coupled to the converter output to effectively cancel any common-mode voltage component that would otherwise appear.

Figure 4:
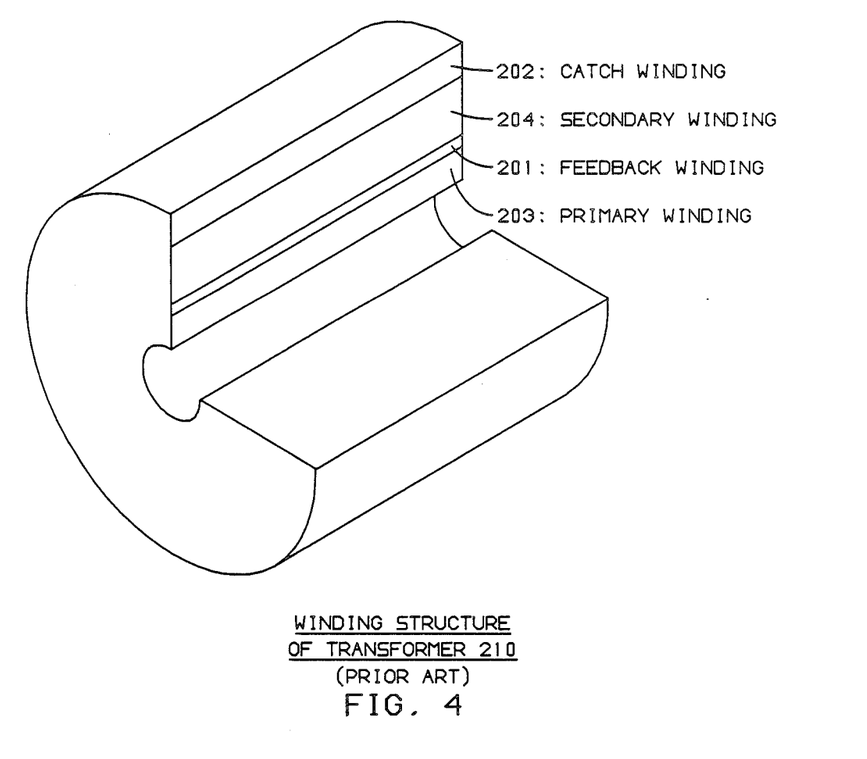
FIG. 4 is an illustration of the winding structure of a transformer included in one embodiment of the circuit of FIG. 2 where the transformer windings are separately wound.
Figure 9:
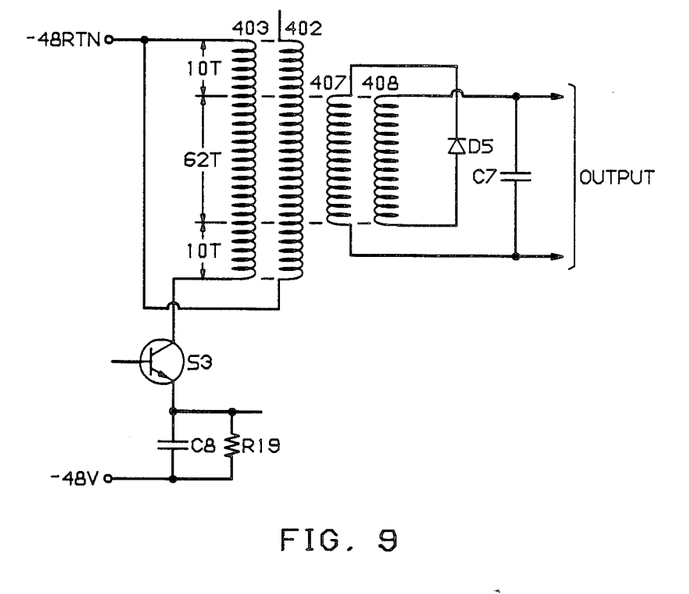
FIG. 9 illustrates a modification of the circuit of FIG. 5 involving a multifilar transformer in which two windings are first bifilar wound, then four windings are quadfilar wound, and then the two windings are again bifilar wound.

In the schematic of FIG. 5, the windings 303, 302, 307, and 308 all have an equal number of turns since they are quadfilar wound from one end to the other. Although this arrangement advantageously reduces the unwanted generation of common-mode noise, it restricts the primary to secondary turns ration to 1:2. In accordance with a further aspect of the present invention, this restriction is removed using a technique whereby two of the four windings are bifilar wound for NA turns, then all four windings are quadfilar wound for NB turns, and finally the first two windings are again bifilar wound for NC turns. To achieve approximately the same turns ratio that was present in the embodiment of FIG. 4, values of NA=NC=10 and NB=62 are chosen. The turns ratio achieved is 82:124 (the turns ratio of the embodiment of FIG. 4 is 81:123). In general, NA and NC are selected to equal the absolute value of (N3−N1)/2, where N1, N2, N3 and N4 are the numbers of turns of windings 403, 402, 408 and 407, respectively, with N1=N2 and N3=N4. The winding arrangement is shown in FIG. 9, where windings 403, 402, 407 and 408 correspond to windings 303, 302, 307 and 308 in the equal turns quadfilar embodiment of FIG. 5.

The incorporation of the multifilar transformer 410 into battery feed circuit 50 is shown in FIG. 1. Dummy winding 402 can advantageously serve the same function as catch winding 202 in FIG. 2 by connecting its dotted end to the −48 RTN terminal of DC source 20 and connecting its nondotted end via a diode D6 to the −48 V terminal. Feedback winding 401 comprises ten turns separately wound from the other windings 403, 403, 407 and 408 to serve the same function as feedback winding 201 in the circuit of FIG. 2.

METHOD OF WINDING TRANSFORMER 410

Figure 10:
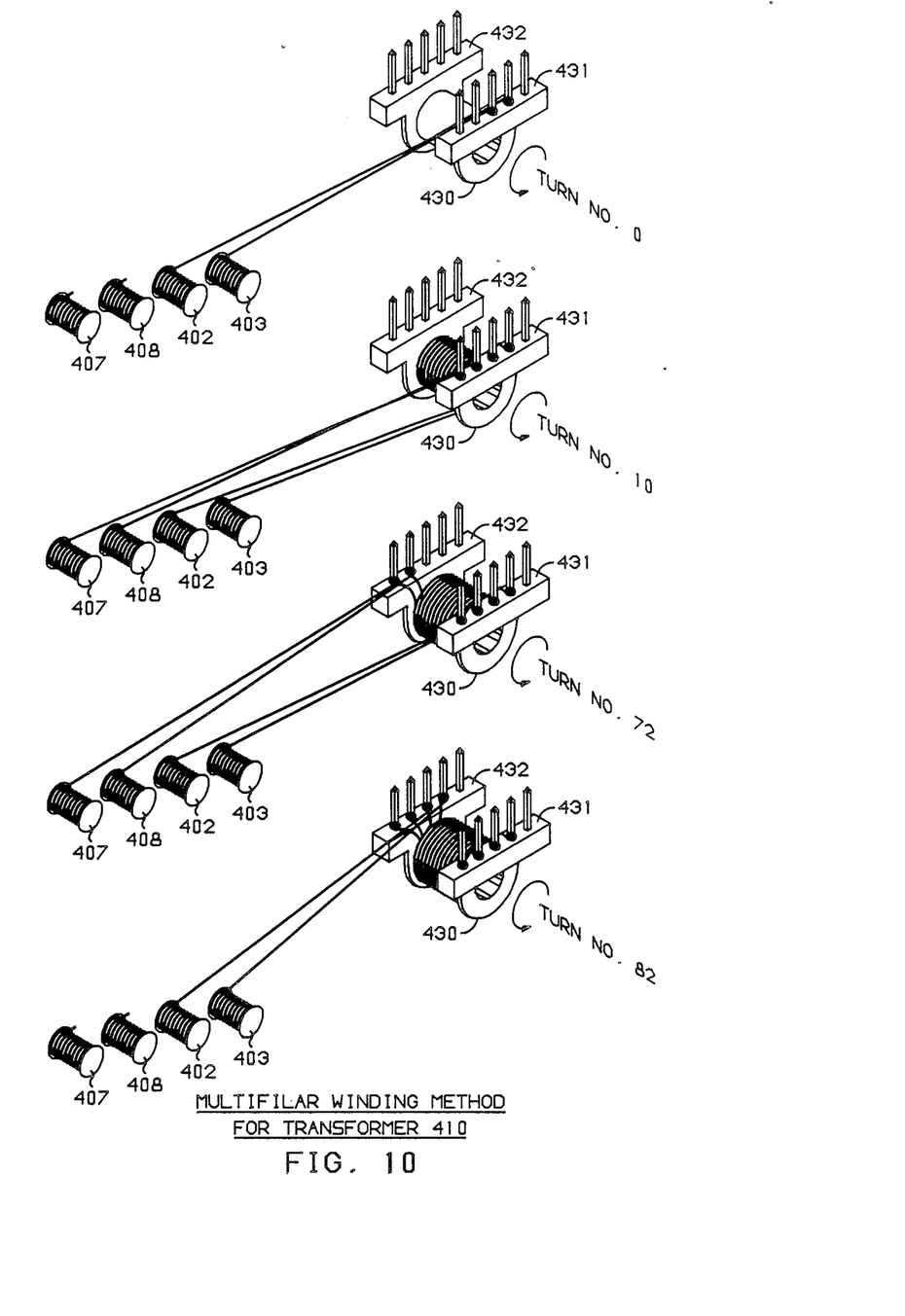
FIG. 10 illustrates a method of winding the multifilar transformer of FIG. 9.

FIG. 10 depicts an illustrative method of winding the multifilar windings of transformer 410. As shown in FIG. 10, transformer 410 includes a core 430 and two connector assemblies 431 and 432. The method proceeds as follows. First the conductors of windings 402 and 403 are connected to terminals of connector assembly 431 and bifilar wound around core 430 for 10 turns. Then the conductors of windings 407 and 408 are connected to terminals of connector assembly 431 and the four windings 402, 403, 407 and 408 are quadfilar wound around core 430 for 62 turns. Windings 407 and 408 are then connected to terminals of connector assembly 432 and terminated. Windings 402 and 403 are again bifilar wound around core 430 for 10 additional turns. Windings 402 and 403 are then connected to terminals of connector assembly 432 and terminated. Although not shown in FIG. 10, the winding 401 of transformer 410 is separately wound around core 430 either before or after the multifilar windings 402, 403, 407 and 408, and is connected to the remaining terminals of connector assemblies 431 and 432.

Figure 11:
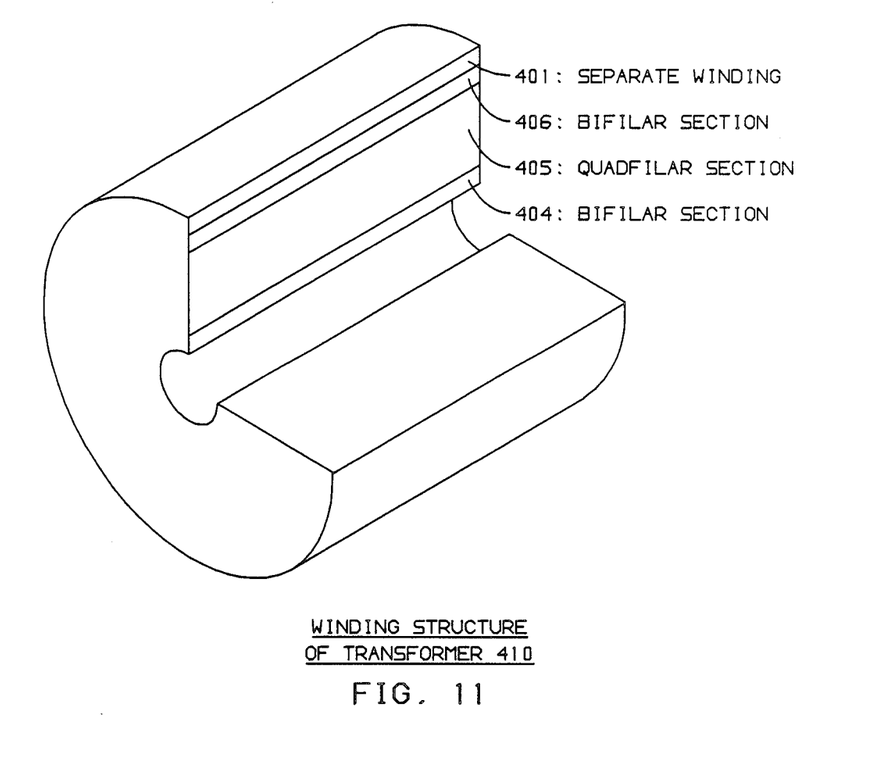
FIG. 11 is an illustration of the winding structure of the multifilar transformer of FIG. 1.

FIG. 11 is an illustration of the winding structure of transformer 410. As shown, transformer 410 includes separate winding 401, a first bifilar section 404 comprising 10 turns of the conductors of windings 402 and 403, a quadfilar section 405 comprising 62 turns of the conductors of windings 402, 403, 407 and 408, and a second bifilar section 406 comprising 10 additional turns of the conductors of windings 402 and 403.

It is to be understood that the above-described embodiment is merely illustrative of the principles of the invention and that other arrangements may be devised by those skilled in the art without departing from the spirit and scope of the invention.

What is claimed is:

1. A method of winding a multifilar transformer comprising first, second, third, and fourth windings around a single core, said method comprising the following steps in sequence:
    (a) bifilar winding said first and second windings around said core for NA turns, NA being a positive integer,
    (b) after step (a), quadfilar winding said first, second, third and fourth windings around said core for NB turns, NB being a positive integer and
    (c) after step (b), bifilar winding said first and second windings around said core for NC turns, NC being a positive integer.

2. A method in accordance with claim 1 where NA and NC are substantially equal.

3. A multifilar transformer comprising first, second, third, and fourth windings wound around a single core, each of said windings comprising a conductor,
    first lengths of said conductors of said first and second windings being bifilar wound around said core for NA turns, NA being a positive integer,
    second lengths of said conductors of said first and second windings, together with said conductors of said third and fourth windings, being quadfilar wound around said core for NB turns, NB being a positive integer and
    third lengths of said conductors of said first and second windings being bifilar wound around said core for NC turns, NC being a positive integer.

4. A transformer in accordance with claim 3 where NA and NC are substantially equal.

* * * * *